D. A. LOHR.
ADVERTISING NOVELTY.
APPLICATION FILED MAY 29, 1911.
1,061,302.
Patented May 13, 1913.
2 SHEETS—SHEET 2.
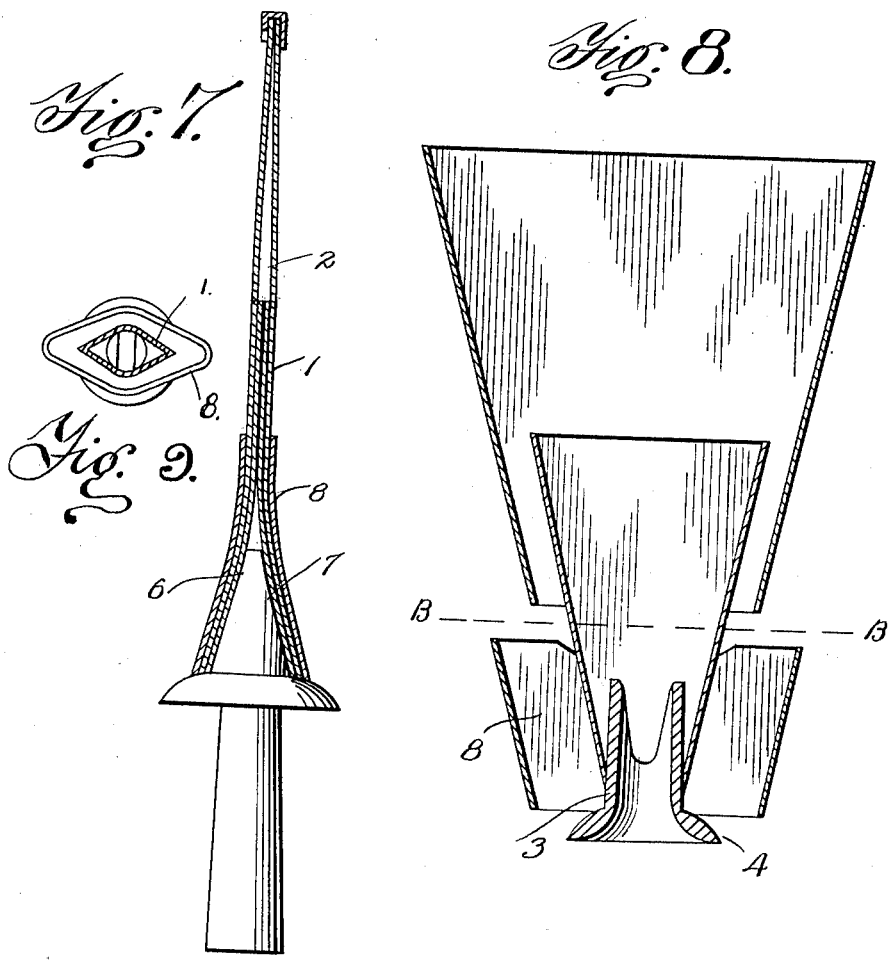
WITNESSES
INVENTOR
Dorsie A Lohr

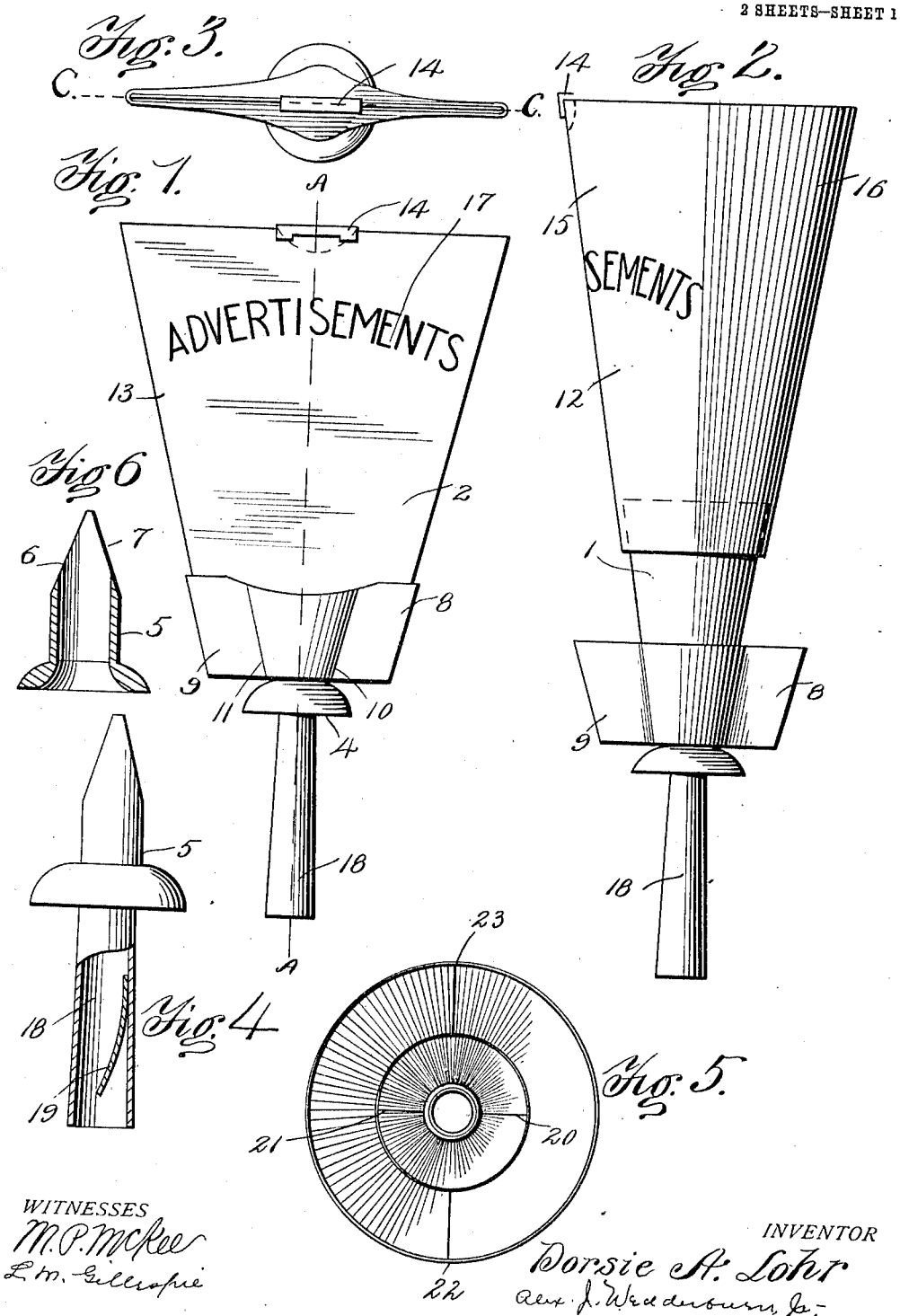

UNITED STATES PATENT OFFICE.

DORSIE A. LOHR, OF WOODLAWN, PENNSYLVANIA.

ADVERTISING NOVELTY.

1,061,302.   Specification of Letters Patent.   Patented May 13, 1913.

Application filed May 29, 1911.  Serial No. 630,084.

*To all whom it may concern:*

Be it known that I, DORSIE A. LOHR, a citizen of the United States, residing at Woodlawn, in the county of Beaver and State of Pennsylvania, have invented certain new and useful Improvements in Advertising Novelties, of which the following is a specification.

This invention relates to an improvement in advertising novelties and its object is to provide a combination fan, horn and megaphone, which can be constructed entirely of paper and at a very low cost and which may be used to print advertisements on.

With the above and other objects in view, I have invented the device illustrated in the accompanying drawings in which, Figure 1 is a side elevation of my device as used for a fan, Fig. 2 is an elevational view of the device as used for a horn, Fig. 3 is a top plan view of my device showing the device when used as shown in Fig. 1, Fig. 4 is a detail elevational view of horn and megaphone mouthpieces connected. Fig. 5 is a view looking into the large end of my device when opened as for a megaphone. Fig. 6 is a detail longitudinal sectional view of a megaphone mouthpiece, Fig. 7 is a longitudinal sectional view of the parts in position to be joined to form a fan or a megaphone. Fig. 8 is a vertical section of the device as shown in Fig. 2. Fig. 9 is a view taken on line B—B of Fig. 8 looking toward the mouthpiece.

Referring to the accompanying drawings 1 indicates a truncated conical member which is adapted to be flattened at its larger end the small end 3 of which is opened to receive a megaphone mouthpiece 4 which has a reduced tubular neck 5 cut away at 6 and 7 on two opposing sides so as to present flat surfaces against which the cone 1 may be flattened. Secured to the tube 5 is a member 8, the projecting portions 9 and 10 of which are flattened and the sides thereof slightly spread apart and the central part 11 is tubular to accommodate the conical member 1, the small end of which is located within said tubular portion, and the small end of the member 12.

Telescopically mounted on the member 1 is a similar shaped member 12, which is larger than the member 1 and which is also adapted to be flattened as shown in Fig. 1, this member 12 is telescopic on the member 1. The small end of the member 12 is adapted to slide into the member 8 when flattened and is thereby held flat. On the outer end of this telescopic member is a clip 14 which is adapted to hold the two sides 15 and 16 of the member 12 together when it is desired to hold it flat to be used as a fan. Advertisements 17 may be printed on the sides of the member. The members 1 and 12 are made preferably of heavy paper. A horn mouthpiece 18 is slidable into the mouthpiece 5 and is provided with a reed 19, by means of which the device may be used as a horn. This member 18 also acts as a handle for the device when used as a fan. This member gradually spreads toward its outer end so that it cannot be pushed too far into the mouthpiece 5 and will be frictionally held therein.

When it is desired to change the device from a fan as in Fig. 1 to a megaphone or horn as in Fig. 2, the member 12 is slid into the position shown in Figs. 8 and 9 and is then rotated half way around on the member 1 and then pushed out as far as possible on that member as shown in Figs. 2, and 5, the creased edges 20 and 21 of the member 1 being transverse to the creased edges 22 and 23 of the member 12, thus the members are spread apart to a horn shape and are so held by the opposing action of the two members.

I claim and desire to secure by Letters Patent:—

1. An advertising novelty consisting of a megaphone adapted to be collapsed, and means for holding the same collapsed whereby it may be used for a fan.

2. An advertising novelty consisting of a megaphone adapted to be collapsed, means for holding the same collapsed whereby it may be used for a fan, said megaphone consisting of a pair of telescopic members.

3. An advertising novelty consisting of a megaphone adapted to be collapsed, means for holding the same collapsed whereby it may be used for a fan, said megaphone consisting of a pair of telescopic members, and a mouthpiece for said megaphone having inner opposing tapering surfaces.

4. An advertising novelty consisting of a megaphone adapted to be collapsed, means for holding the same collapsed whereby it may be used for a fan, said megaphone consisting of a pair of telescopic members, a mouthpiece for said megaphone having an inner tapering surface, and a tapering musical mouthpiece adapted to frictionally engage said first mouth piece and adapted to form a handle.

5. An advertising novelty consisting of a megaphone adapted to be collapsed, means for holding the same collapsed whereby it may be used for a fan, said megaphone consisting of a pair of telescopic members, a mouthpiece for said megaphone having an inner tapering surface, a tapering musical mouthpiece adapted to frictionally engage said first mouthpiece, and adapted to form a handle, said means consisting of a flattened member adapted to engage one end of one of said telescopic members.

6. An advertising novelty consisting of a megaphone adapted to be collapsed, whereby it may be used for a fan, said megaphone consisting of a pair of telescopic members, a mouthpiece for said megaphone having an inner tapering surface, a tapering musical mouthpiece adapted to frictionally engage said first mouthpiece, and adapted to form a handle, a flattened member adapted to engage one end of said telescopic members when telescoped, and a clip on the large end of the larger of said telescopic members.

7. An advertising novelty consisting of a megaphone adapted to be collapsed, whereby it may be used for a fan, said megaphone consisting of a pair of telescopic members, a mouthpiece for said megaphone having an inner tapering surface, a tapering musical mouthpiece adapted to frictionally engage said first mouthpiece, and adapted to form a handle, a flattened member adapted to engage one end of one of said telescopic members when telescoped, a clip on the large end of the larger of said telescopic members, one of said telescopic members being rotatable on the other of said members.

8. An advertising novelty consisting of a megaphone adapted to be collapsed, whereby it may be used for a fan, said megaphone consisting of a pair of telescopic members, a mouthpiece for said megaphone having an inner tapering surface, a tapering musical mouthpiece adapted to frictionally engage said first mouthpiece, and adapted to form a handle, a flattened member adapted to engage one end of one of said telescopic members when telescoped, a clip on the large end of the larger of said telescopic members, one of said telescopic members being rotatable on the other of said members, whereby said members may be held spread apart.

In testimony whereof I affix my signature in presence of two witnesses.

DORSIE A. LOHR.

Witnesses:
C. T. McCauley,
C. W. Miller.

---

Copies of this patent may be obtained for five cents each, by addressing the "Commissioner of Patents, Washington, D. C."